US010729522B2

(12) United States Patent
Jordan

(10) Patent No.: US 10,729,522 B2
(45) Date of Patent: Aug. 4, 2020

(54) METHOD FOR THE VIRTUAL SECONDARY MACHINING OF A GINGIVA MODEL

(71) Applicant: DENTSPLY SIRONA inc., York, PA (US)

(72) Inventor: Thorsten Jordan, Pfungstadt (DE)

(73) Assignee: DENTSPLY SIRONA Inc., York, PA (US)

( * ) Notice: Subject to any disclaimer, the term of this patent is extended or adjusted under 35 U.S.C. 154(b) by 314 days.

(21) Appl. No.: 15/327,880

(22) PCT Filed: Jul. 31, 2015

(86) PCT No.: PCT/EP2015/067647
§ 371 (c)(1),
(2) Date: Jan. 20, 2017

(87) PCT Pub. No.: WO2016/016423
PCT Pub. Date: Feb. 4, 2016

(65) Prior Publication Data
US 2018/0206949 A1 Jul. 26, 2018

(30) Foreign Application Priority Data
Jul. 31, 2014 (DE) .......................... 10 2014 215 103

(51) Int. Cl.
*G06T 15/00* (2011.01)
*A61C 13/00* (2006.01)
*G06T 19/20* (2011.01)

(52) U.S. Cl.
CPC .......... *A61C 13/0004* (2013.01); *G06T 19/20* (2013.01)

(58) Field of Classification Search
CPC ............................ G06T 19/20; A61C 13/0004
USPC .......................................................... 345/418
See application file for complete search history.

(56) References Cited

U.S. PATENT DOCUMENTS

| 7,854,611 | B2 * | 12/2010 | Yau | A61C 13/0004 433/213 |
| 8,386,061 | B2 * | 2/2013 | Violante | A61C 13/0004 433/24 |
| 8,738,340 | B2 * | 5/2014 | Dunne | A61B 5/4547 703/7 |
| 8,780,106 | B2 * | 7/2014 | Chishti | A61C 7/00 345/419 |

(Continued)

FOREIGN PATENT DOCUMENTS

| WO | 2009010543 A1 | 1/2009 |
| WO | 2013120955 A1 | 8/2013 |

(Continued)

OTHER PUBLICATIONS

Kumar, Yokesh, Ravi Janardan, and Brent Larson2and Joe Moon. "Improved Segmentation of Teeth in Dental Models." (2011).*

(Continued)

*Primary Examiner* — Phu K Nguyen
(74) *Attorney, Agent, or Firm* — Dentsply Sirona Inc.

(57) ABSTRACT

The invention relates to a method for the virtual secondary machining of a virtual three-dimensional gingiva model, said model having been created during the planning of an artificial gingiva. Here, the virtual gingiva model is virtually machined by at least one defined three-dimensional surface structure of the gingiva model being modified by means of a virtual tool using a computer.

6 Claims, 2 Drawing Sheets

(56) References Cited

U.S. PATENT DOCUMENTS

| | | | |
|---|---|---|---|
| 9,707,061 B2* | 7/2017 | Morales | A61C 13/34 |
| 9,767,223 B2* | 9/2017 | Fisker | A61C 13/0004 |
| 9,833,301 B2* | 12/2017 | Fisker | A61C 13/0004 |
| 9,872,745 B2* | 1/2018 | Fisker | A61C 13/01 |
| 9,939,806 B2* | 4/2018 | Leeson | G05B 19/40937 |
| 10,123,856 B2* | 11/2018 | Schulter | A61C 8/0027 |
| 10,166,091 B2* | 1/2019 | Cowburn | A61C 19/04 |
| 2012/0282567 A1 | 11/2012 | Nilsson | |

FOREIGN PATENT DOCUMENTS

| | | | |
|---|---|---|---|
| WO | 2013124452 A1 | 8/2013 | |
| WO | 2014064165 A1 | 5/2014 | |

OTHER PUBLICATIONS

Kim CH, Shin JH, Lee SJ. Interactive 3D simulation system for orthodontic treatment of malocclusion. InApplied Mechanics and Materials 2013 (vol. 284, pp. 1647-1650). Trans Tech Publications.*
International Search Report dated Nov. 9, 2015.
German Office Action dated May 11, 2015.

* cited by examiner

METHOD FOR THE VIRTUAL SECONDARY MACHINING OF A GINGIVA MODEL

CROSS-REFERENCE TO RELATED APPLICATIONS

This is a National Phase application of International Application No. PCT/EP2015/067647 filed Jul. 31, 2015, which claims the benefit of and priority to German Application Ser. No. 102014215103.1, filed on Jul. 31, 2014, which are herein incorporated by reference for all purposes.

TECHNICAL FIELD

The invention relates to a method for the virtual secondary machining of a first virtual three-dimensional gingiva model, said model having been created during the planning of an artificial gingiva.

BACKGROUND OF THE INVENTION

Several methods for designing dental prostheses are known from the prior art.

In designing a three-dimensional model of an artificial gingiva within the context of designing a full prosthesis, the shape of the gingiva is anatomically appropriately adjusted to the jaw and to the planned tooth restorations. In known methods for producing full prostheses, the first step is to make an impression of the edentulous jaw and gradually apply by hand a gingiva model in several layers of a permanently soft plastic. The dental replacements for the teeth are then arranged relative to the gingiva model.

One disadvantage of this method is that designing a full prosthesis is time-consuming and takes several manual steps.

The object of the preliminary invention is therefore to provide a method for the virtual secondary machining of a gingiva model that permits simpler, rapid and anatomically appropriate machining.

SUMMARY OF THE INVENTION

The invention relates to a method for the virtual secondary machining of a virtual three-dimensional gingiva model, said model having been created during the planning of an artificial gingiva. Here, the virtual gingiva model is virtually machined by at least one defined three-dimensional surface structure of the gingiva model being modified by means of a virtual tool using a computer.

The virtual three-dimensional gingiva model is the result of the planning of an artificial gingiva of a full prosthesis or even of a partial prosthesis. In the planning of the full prosthesis or partial prosthesis, a three-dimensional model of the jaw, which can be edentulous, is used. In the case of a partial prosthesis, the jaw still includes residual teeth, wherein the gingiva can recede in areas with missing teeth. In these areas, the artificial gingiva of the partial prosthesis is also used with the artificial teeth. The present method can also be used in the planning of an implant bridge or a simple crown in cases where it makes sense to supplement the dental prosthesis with artificial gingiva. The model of the jaw can for example be created with a dental camera for three-dimensional measurement. On the basis of the model of the jaw, the three-dimensional models of the teeth in relation to the jaw are then planned. In the next step, the gingiva model of the artificial gingiva is planned, wherein the gingiva model is defined by a gingival boundary to the existing jaw and by a gingival boundary to the planned models of the teeth. Using a computer-aided analytical procedure, the virtual gingiva model can then be divided into several three-dimensional surface structures. In the secondary machining, the user can then select a particular surface structure by means of the virtual tool using input means, such as a mouse or keyboard, and change, for example, the height, the thickness, or the course of the gingival boundary of this surface structure.

One advantage of this method is that the gingiva model is divided automatically into anatomically meaningful surface structures and can be modified selectively by means of the virtual tool. This means that an anatomically meaningful adjustment of the gingiva model is therefore easier to achieve than with an application of known CAD tools. This is because when CAD tools of this kind are used, a 3D model can be modified point by point without taking anatomical structures into consideration.

Advantageously, the defined surface structure of the gingiva can be an interdental space, a papilla of a tooth, a tooth root gingival area, a transitional area between the gingiva model and a jaw model and/or a terminating area at the end of the jaw arch.

The surface structure can be the gingiva of an interdental space, wherein the interdental space between two teeth is demarcated by a gingival boundary to a mesial surface of a first tooth and a distal surface of a second tooth.

The papilla of a tooth is defined by a gingival boundary between the gingiva and the tooth and also by a curve running around this tooth. In most cases the gingiva describes a curve that proceeds almost vertically from the tooth surface and then continues parallel to the tooth surface. Here, the papilla typically has a width of 2 mm as seen in a labial or buccal direction from the tooth surface. The papilla has a first highest point on a mesial side and a second highest point on a distal side. The papilla also has a lowest point on the lingual or buccal side. A height of the papilla between one of the two highest points and the lowest point along a tooth axis of the respective tooth typically measures 4 mm.

The tooth root gingival area abuts on the papilla of this tooth, wherein the tooth root gingival area is defined by a thickened area of the gingiva around the tooth root. By means of the computer-aided method, these thickenings around the tooth roots can be automatically detected by analyzing the course of the gingiva model.

The transitional area from the jaw to the gingiva is located in the boundary area of the gingival boundary between the planned gingiva model and the existing jaw. The transitional area should be designed such that when the full prosthesis is fitted, the artificial gingiva smoothly abuts on the existing gingiva of the jaw.

The terminating area at the end of the jaw arch is demarcated by the distal surface of the last molar and extends to the boundary of the gingiva model.

The remaining areas of the gingiva model can be selected as a single cohesive surface structure by means of the virtual tool and varied, for example, for the purpose of jaw thickening, wherein the thickness of the entire remaining areas is increased or reduced.

Advantageously, the defined surface structure of the gingiva model can be selectively varied by the application of the virtual tool.

This makes it possible to anatomically appropriately adjust the gingiva model.

Advantageously, a height and a course of a gingival boundary of at least one interdental space can be modified by the application of the virtual tool.

In other words, the height or the highest point of the interdental space can be shifted parallel to a tooth axis of the adjacent teeth by the application of the virtual tool. An anatomically typical height difference of the interdental space between a lowest point and a highest point along the tooth axis of one of the adjacent teeth is typically 4 mm at most. When changing the height, the course of the gingival boundary can be automatically adjusted to the adjacent teeth in an anatomically appropriate manner. The course of the surface of the interdental space is also adjusted to the surrounding areas. The user can, for example, shift the highest point of the interdental space along the tooth axis of one of the two adjacent teeth, wherein the areas of the interdental space around this highest point are membranously reshaped.

Advantageously, a height and a course of a gingival boundary of at least one papilla can be modified by the application of the virtual tool.

When changing the height of the papilla, the lowest point can, for example, be shifted along the tooth axis of the respective tooth, wherein the course of the gingival boundary can be correspondingly adjusted to the tooth.

Advantageously, a gingival boundary of a papilla can be modified by the application of the virtual tool in such a way that a lowest point of the papilla is shifted in a lingual, buccal, labial, or palatal direction.

The lowest point of the papilla can in other words be shifted by means of the virtual tool, wherein the course of the gingival boundary as well as the surface of the papilla are adapted to the surrounding areas of the gingiva model.

Advantageously, a gingival boundary of a papilla can be modified by the application of the virtual tool in such a way that a highest point of the papilla is shifted in an occlusal, incisal, or cervical direction.

The highest point of the papilla at one of the two ends is thus shifted in an occlusal, incisal, or cervical direction, wherein the transitions to the adjacent surface structures of the gingiva model are adjusted.

Advantageously, a thickness of a selected surface structure of the gingiva can be modified by the application of the virtual tool.

In other words, an interdental space, a papilla, or the tooth root gingival area can thus be selected and its thickness selectively changed, wherein the transitions to the adjacent surface structures are adjusted so that a smooth and continuous shape is formed. The individual papillae or tooth root gingival areas, for example, can thereby be made thicker.

Advantageously, a thickness of the transitional area of the gingiva at the end of the jaw can be increased or reduced by the application of the virtual tool.

The transitional area at the end of the jaw, which from the gingival boundary to the distal surfaces of the last molars typically has a width of 4 mm at most, can thereby have its thickness modified.

Advantageously a general thickness of the entire gingiva model can be varied by the application of the virtual tool.

The remaining areas of the gingiva model can, for example, be selected thereby as a single cohesive surface structure and the overall thickness of the gingiva model varied in a single step.

Advantageously, the surface structure of the gingiva model can be automatically defined with computer assistance by the use of an analytical method.

The gingiva model is thereby automatically divided into different surface structures that permit an anatomically appropriate adjustment.

Advantageously, the surface structure can be selected by means of the virtual tool, wherein this surface structure can be graphically highlighted by changing its color or its transparency.

The selected surface structure is thereby graphically highlighted to make it easy for the user to see which surface structure is currently undergoing secondary machining.

BRIEF DESCRIPTION OF THE DRAWINGS

The invention is explained with reference to the drawings. The figures depict the following.

DETAILED DESCRIPTION OF THE INVENTION

Figure 1:
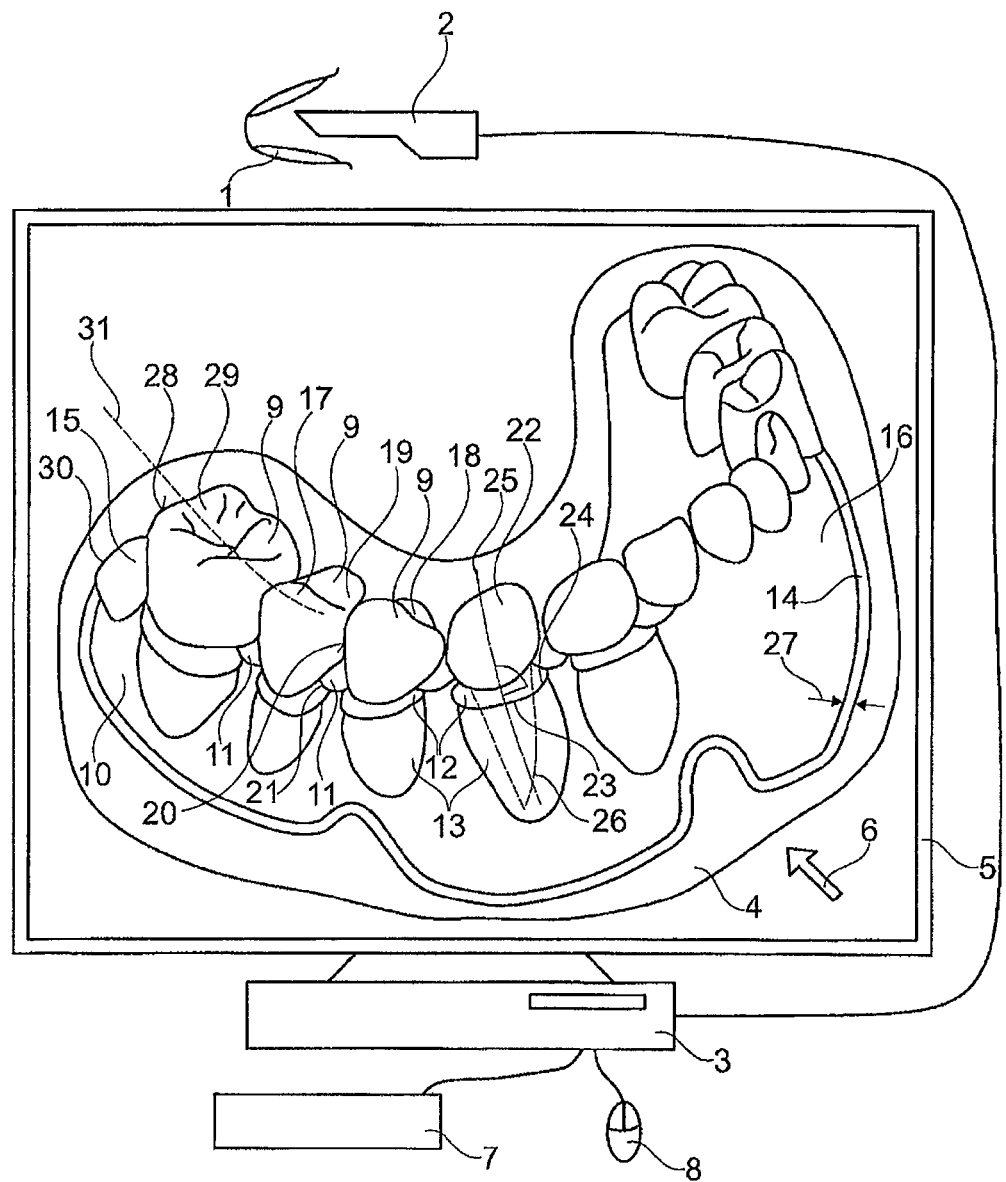
FIG. 1 shows a sketch to illustrate the present method.

FIG. 1 shows a sketch to illustrate the present method. In a first step, the dental situation of a toothless jaw 1 is recorded by an optical three-dimensional dental camera 2. The dental camera can for example be based on a projection method. The generated image data of the camera 2 are sent to a computer 3. A jaw model 4 of the edentulous jaw 1 is displayed by means of a display device 5, such as a monitor. The user, such as a dentist or a dental technician, can navigate within the jaw model 4 using a cursor 6 by means of the input devices, such as a keyboard 7 or a mouse 8. In the next step, the shape of the tooth models 9 of the artificial teeth and their arrangement relative to the jaw model 4 are planned. In the next step, a virtual three-dimensional gingiva model 10 is planned, wherein the shape and the arrangement of the jaw model 4 and of the planned tooth models 9 are incorporated.

Following the planning of the gingiva model 10, the method of the present invention commences, wherein the gingiva model 10 undergoes virtual secondary machining. Secondary machining is carried out by dividing the gingiva model 10 into a plurality of surface structures, such as an interdental space 11, a papilla 12, a tooth root gingival area 13, a transitional area 14 in the marginal area between the gingiva model 10 and the jaw model 4, or a terminating area 15 at the end of the jaw arch. The remaining areas 16 of the gingiva model 10 can also be grouped together as a unified surface structure and its thickness, for example, varied. The individual surface structures 11, 12, 13, 14, 15, and 16 can in other words be selected individually and, for example, the height, the thickness, or the course of the gingival boundary of this surface structure modified. An interdental space 11 lies between two adjacent tooth models 17 and 18, wherein the interdental space 11 is demarcated by a gingival boundary to a mesial surface 19 toward the middle of the dental arch of the first tooth model 17 and by a gingival boundary to a distal surface 20 of the second tooth model 18 toward the end of the dental arch. The interdental space is laterally demarcated by an arcuate boundary line 21.

The papilla 12 of a tooth model 22 is demarcated by a curve 23 around this tooth model 22, wherein the course of the papilla 12 typically begins in a plane 24 almost orthogonal to a tooth axis 25 of the tooth model 22 and continues almost parallel to the surface of the tooth.

The tooth root gingival area 13 abuts directly on the papilla 12 of a tooth and lies above a concealed tooth root 26. By means of a computer-aided analytical method, a thickening of the gingiva located above the tooth root 26 can be detected by analyzing the course of the gingiva model 10 and recognizing this thickening as an elevation in comparison with the even course of the gingiva model in the remaining areas 16 between the tooth root gingival areas 13. This thickening is then defined as a tooth root gingival area 13.

The transitional area 14 in the marginal area of the gingiva model 10 to the existing jaw model 4 can be defined by, for example, defining a marginal area of the gingiva model 10 having a width 27 of 2 mm. The transitional area 15 at the end of the jaw is defined by a distal surface 28 of a last molar 29 and extends along a jaw axis 31 up to a lateral gingival boundary 30 of the gingiva model.

Figure 2:
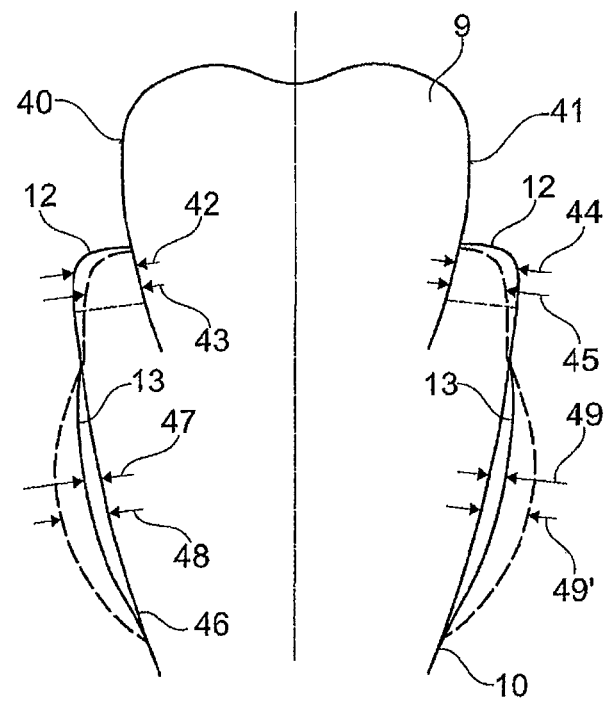
FIG. 2 shows a sketch to illustrate the application of a first virtual tool.

FIG. 2 shows a sketch to illustrate the application of the virtual tool. A tooth model 9 and the gingiva model 10 are shown in a sectional view orthogonal to the jaw axis 31 from FIG. 1. Using a first virtual tool, a papilla 11 on a buccal side 40 and on a palatal side 41 of the tooth model is selected. The thickness of the papilla 12 is then reduced so that at the buccal side 40, the papilla is reduced from a first thickness 42 to a modified thickness 43, wherein the course of the papilla following application of the virtual tool is shown as a dashed line. The papilla 12 on the palatal side 41 is reduced from a thickness 44 to a modified thickness 45, wherein the modified papilla is shown as a dashed line.

Using a second virtual tool, the thickness is modified of a tooth root gingival area 13, which is recognizable as a thickening in comparison with the even course 46 of the remaining areas 16 between the tooth root gingival areas 13. Here, on the buccal side 40, the thickness is increased from a first thickness 47 to a second, modified thickness 48, wherein the modified tooth root gingival area 13 is shown as a dashed line. The opposite tooth root gingival area 13 on the palatal side 41 is correspondingly modified, wherein the thickness is increased from a first thickness 49 to a second, modified thickness 49', wherein the modified tooth root gingival area is shown as a dashed line. In this way, the present method makes it possible to modify the gingiva model 10 anatomically appropriately in a few steps.

Figure 3:
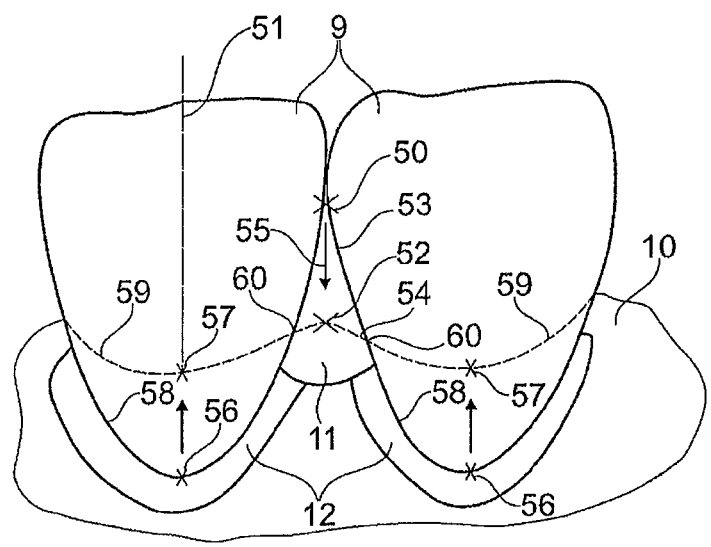
FIG. 3 shows a sketch to illustrate the application of another virtual tool.

FIG. 3 shows a sketch to illustrate the application of another virtual tool. The two tooth models 9 and a section of the gingiva model 10 are shown in a view from a labial direction. By the application of a third virtual tool, a highest point 50 of the interdental space 11 is shifted along a tooth axis 51 of one of the two tooth models 9 up to a modified highest point 52, wherein the course of the gingival boundary 53 of the interdental space 11 is automatically adjusted to the surrounding areas. The modified course 54 of the gingival boundary of the interdental space 11 is shown as a dashed line. An arrow 55 indicates the shift of the highest point 50 to the modified highest point 52. By the application of a fourth virtual tool, a lowest point 56 of the papilla 12 of one of the two tooth models 9 is shifted to a modified lowest point 57, wherein the course of a gingival boundary 58 of the papilla 12 is appropriately adjusted. The modified gingival boundary 59 of the modified papilla is shown as a dashed line. The courses of the gingival boundaries 54 and 59 within the interdental space 11 and the papilla 12 are thus automatically adjusted such that a smooth and steady transition is created between the interdental space 11 and the papilla 12 in the transitional areas 60. In this way, the application of these special virtual tools makes it possible to adjust the gingiva model selectively and anatomically appropriately in a few steps.

REFERENCE SYMBOLS

1 Edentulous jaw
2 Optical three-dimensional dental camera
3 Computer
4 Jaw model
5 Display device
6 Cursor
7 Keyboard
8 Mouse
9 Tooth model
10 Gingiva model
11 Interdental space
12 Papilla
13 Tooth root gingival area
14 Transitional area
15 Terminating area
16 Remaining areas
17 Tooth model
18 Tooth model
19 Mesial surface
20 Distal surface
21 Arcuate boundary line
22 Tooth model
23 Curve
24 Plane
25 Tooth axis
26 Tooth root
27 Width
28 Distal surface
29 Molar
30 Lateral gingival boundary
31 Jaw axis
40 Buccal side
41 Palatal side
42 Thickness
43 Thickness
44 Thickness
45 Thickness
46 Even course
47 Thickness
48 Thickness
49 Thickness
50 Highest point
51 Tooth axis
52 Modified highest point
53 Course of the gingival boundary
54 Modified course
55 Arrow
56 Lowest point
57 Modified lowest point
58 Gingival boundary
59 Modified gingival boundary
60 Transitional area

The invention claimed is:

1. Method for the virtual secondary machining of a virtual three-dimensional gingiva model, said model having been created during the planning of an artificial gingiva, comprising the steps of:
modifying the virtual three-dimensional gingiva model using a virtual tool by;
automatically dividing the virtual three-dimensional gingiva model into a plurality of individual three-dimensional anatomical surface structures by taking anatomical structures of the virtual three-dimensional gingiva model into consideration such that the plurality of individual three-dimensional anatomical surface structures are configured to be selectively modifiable, and
subsequently to the step of automatically dividing the virtual three-dimensional gingival model, virtually machining the virtual three-dimensional gingiva model by automatically and anatomically adjusting the same virtual three-dimensional gingiva model based on a part of the same virtual three dimensional gingiva model, wherein the adjusting step includes individually modifying dimensions of the anatomical surface structures by automatically adjusting a height, thickness or course of a selected anatomical surface structure or of a gingival boundary within at least one interdental space or papilla based on properties of surrounding areas such that the virtual three-dimensional model is automatically adjusted in a transitional area of the same virtual three-dimensional model in an anatomically dependent manner such that a transition to an adjacent surface structure is substantially smooth and a continuous shape is formed, wherein the plurality of individual three dimensional anatomical surface structures of the virtual three-dimensional gingiva are selected from the group consisting of the at least one interdental space, the papilla, a tooth root gingival area, a transitional area between the gingiva model and a jaw model a terminating area at the end of the jaw arch, and combinations thereof, wherein the height and the course of the gingival boundary of the at least one interdental space is automatically modified in an anatomically dependent manner by the application of a virtual tool, wherein the height and the course of the gingival boundary of the papilla are automatically modified in an anatomically dependent manner by the application of a virtual tool, wherein the gingival boundary of the papilla is automatically modified in an anatomically dependent manner by the application of a virtual tool in such a way that a lowest point of the papilla is shifted in a lingual, buccal, labial, or palatal direction, wherein the gingival boundary of the papilla is automatically modified in an anatomically dependent manner by the application of a virtual tool in such a way that a highest point of the papilla is shifted in an occlusal, incisal, or cervical direction, wherein a thickness of the selected anatomical surface structure of the virtual three-dimensional gingiva model is automatically modified in an anatomically dependent manner by the application of a virtual tool, wherein a thickness of the transitional area of the virtual three-dimensional gingiva model at the end of the jaw is automatically increased or reduced in an anatomically dependent manner by the application of the virtual tool, wherein a general thickness of the virtual three-dimensional gingiva model is automatically varied in an anatomically dependent manner by the application of a virtual tool.

2. Method according to claim 1, wherein the plurality of individual three dimensional anatomical surface structures of the virtual three-dimensional gingiva model are defined automatically with computer assistance by the application of an analytical method.

3. Method according to claim 1, wherein the selected anatomical surface structure is graphically highlighted by changing its color or transparency.

4. Method according to claim 1, wherein the properties of surrounding areas include a tooth axis of an adjacent tooth.

5. Method for the virtual secondary machining of a virtual three-dimensional gingiva model, said model having been created during the planning of an artificial gingiva, comprising the steps of:

modifying the virtual three-dimensional gingiva model using a virtual tool by;

automatically dividing the virtual three-dimensional gingiva model into a plurality of individual three dimensional anatomical surface structures by taking anatomical structures into consideration, and subsequently to the step of automatically dividing the virtual three-dimensional gingival model, virtually machining the virtual three-dimensional gingiva model by automatically and anatomically adjusting the same virtual three-dimensional gingiva model, wherein the adjusting step includes individually modifying dimensions of the anatomical surface structures by automatically adjusting a height, thickness or course of a selected anatomical surface structure or of a gingival boundary within at least one interdental space or papilla based on properties of surrounding areas such that the virtual three-dimensional model is automatically adjusted in a transitional area of the same virtual three-dimensional model in an anatomically dependent manner such that a transition to an adjacent surface structure is substantially smooth and a continuous shape of the transition area is formed.

6. The method according to claim 5, wherein by application of the virtual tool, a highest point of the interdental space is shifted along a tooth axis of one of two tooth models surrounding the interdental space, said tooth axis is substantially perpendicular to an occlusal surface of said one of the two tooth models, up to a modified highest point, wherein a course of the gingival boundary of the interdental space is automatically adjusted to the surrounding areas in a substantially smooth manner.

* * * * *